(12) United States Patent
Ku

(10) Patent No.: US 8,274,746 B2
(45) Date of Patent: Sep. 25, 2012

(54) VOICE COIL MOTOR HAVING FINE PATTERN COIL

(75) Inventor: Ping-Han Ku, Tu-Cheng (TW)

(73) Assignee: Hon Hai Precision Industry Co., Ltd., Tu-Cheng, New Taipei (TW)

( * ) Notice: Subject to any disclaimer, the term of this patent is extended or adjusted under 35 U.S.C. 154(b) by 0 days.

(21) Appl. No.: 13/032,655

(22) Filed: Feb. 23, 2011

(65) Prior Publication Data

US 2012/0162791 A1    Jun. 28, 2012

(30) Foreign Application Priority Data

Dec. 24, 2010   (TW) ............................... 99145701 A

(51) Int. Cl.
*G02B 15/14* (2006.01)
(52) U.S. Cl. ...................................... 359/824; 359/694
(58) Field of Classification Search ............... 359/824, 359/694
See application file for complete search history.

(56) References Cited

U.S. PATENT DOCUMENTS 7,079,329 B2 *  7/2006  Yee et al. ..................... 359/696
2009/0262438 A1 * 10/2009  Chou et al. .................. 359/696

* cited by examiner

*Primary Examiner* — James Jones
(74) *Attorney, Agent, or Firm* — Altis Law Group, Inc.

(57) ABSTRACT

An exemplary voice coil motor includes a movable unit, a fixed unit, and a resilient plate. The movable unit includes a hollow lens barrel for accommodating a number of lenses, and at least one fine pattern coil fixed on a sidewall of the lens barrel and configured for electrical connection to a power source. The fixed unit includes a hollow frame structured bracket and a number of magnets mounted on the bracket. The bracket accommodates the movable unit. The magnets surround and are spaced apart from the at least one fine pattern coil. The resilient plate is resiliently connected between the bracket and the lens barrel to hold the lens barrel on the bracket.

8 Claims, 5 Drawing Sheets

VOICE COIL MOTOR HAVING FINE PATTERN COIL

CROSS REFERENCE TO RELATED APPLICATION

This application is related to a commonly-assigned U.S. Pat. No. 7,782,556, entitled "Voice coil motor". Disclosures of the above-identified patent are incorporated herein by reference.

BACKGROUND

1. Technical Field

The present disclosure relates to voice coil motors, and particularly, to a voice coil motor having a plurality of fine pattern coils.

2. Description of Related Art

Voice coil motors are widely used in variable focal length lens modules for moving lenses relative to an image sensor. Generally, the voice coil motor includes an enclosure, a bottom board, a copper coil, a movable bracket for accommodating the lenses, and a plurality of magnets. An assembly of the voice coil motor includes manually wrapping a copper wire around the movable bracket to form the copper coil, with ends of the copper wire soldered onto the movable bracket and used as leads.

However, the copper wire is usual fine and easily torn during assembly. As a result, a lot of copper wire is wasted, costing much time and money.

Therefore, what is needed is an easily assembled voice coil motor.

BRIEF DESCRIPTION OF THE DRAWINGS

Many aspects of the present embodiments can be better understood with reference to the following drawings. The components in the drawings are not necessarily drawn to scale, the emphasis instead being placed upon clearly illustrating the principles of the present embodiments. Moreover, in the drawings, like reference numerals designate corresponding parts throughout the several views.

DETAILED DESCRIPTION

Figure 1:
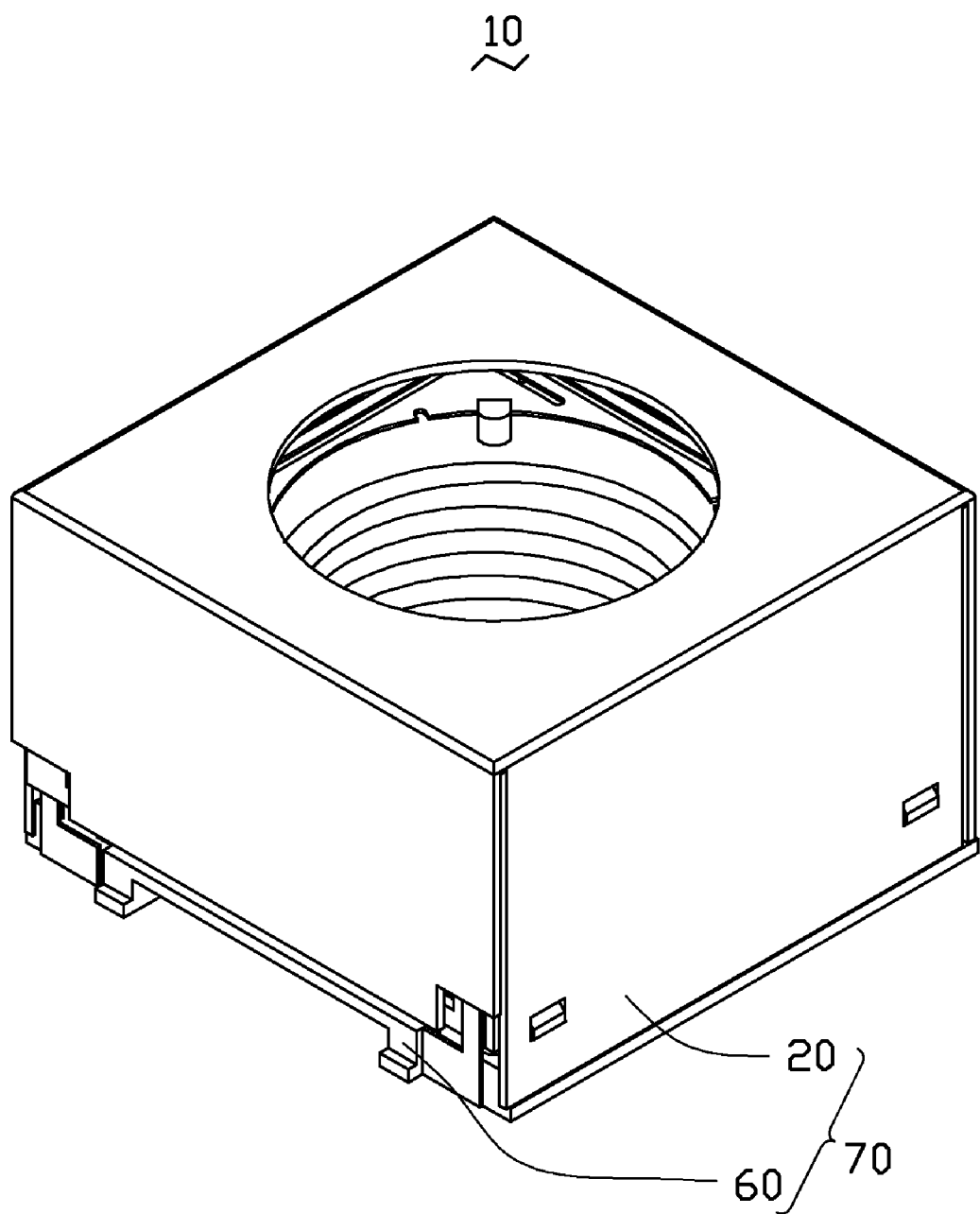
FIG. 1 is a schematic, isometric view of a voice coil motor according to a present embodiment, wherein the voice coil motor includes a movable unit, a resilient plate, and a fine pattern coil.
Figure 2:
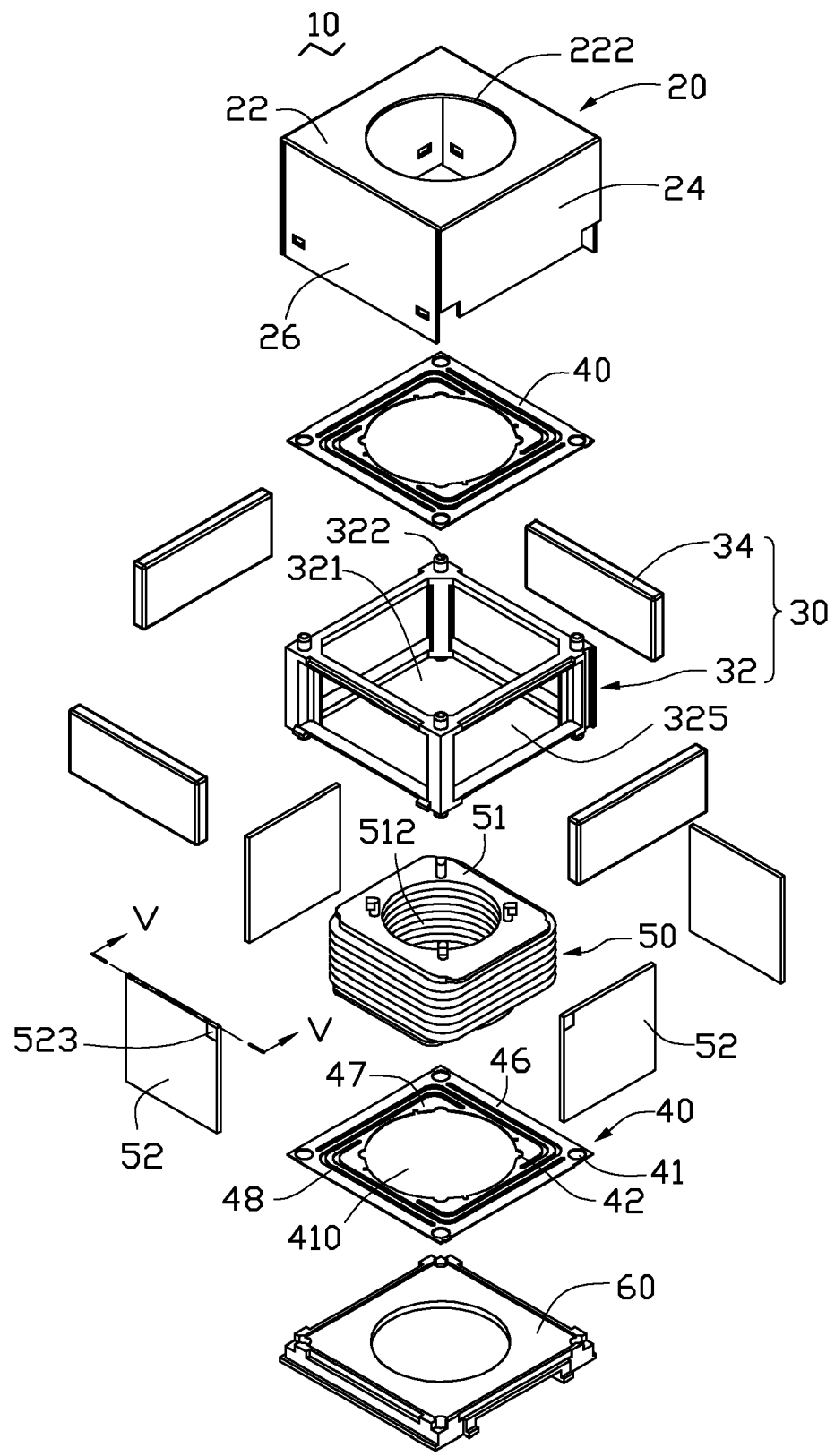
FIG. 2 is an exploded view of the voice coil motor in FIG. 1.

Referring to FIGS. 1 and 2, a voice coil motor 10, in accordance with a present embodiment, includes a housing 70, a fixed unit 30, two resilient plates 40, and movable unit 50.

The housing 70 includes an enclosure 20 and a board 60. The enclosure 20 includes a top panel 22, a first through hole 222 defined in the center of the top panel 22, and two opposite first side panels 24 and two opposite second side panels 26 respectively perpendicularly extending from four sides of the top panel 22 and fastened to one another by use of dovetail panel joints (not shown). The top panel 22, the first side panels 24, and the second side panels 26 cooperatively define a room for accommodating the fixed unit 30, the movable unit 50, and the two resilient plates 40. The board 60 is rectangular, and is used for mounting an imaging sensor (not shown), and the fixing unit 30. The housing 70 is made of an electromagnetic shielding material, such as nickel alloy, conductive plastic, surface conductive material, conductive glass, etc.

The fixed unit 30 includes a bracket 32 and a plurality of magnets 34. The bracket 32 is a cubic frame body having a second accommodation room 321 and four magnet mounting holes 325 respectively formed in four sides thereof. The magnet mounting holes 325 are in communication with the second accommodation room 321. Four locating pins 322 are respectively vertically protruded from the top and bottom sides of the bracket 32 at each corner thereof. The locating pins 322 are configured for fastening the fixed unit 30 to one of the resilient plates 40. The number of the magnets 34 corresponds to that of the magnet mounting holes 325. The magnets 34 are respectively mounted in the magnet mounting holes 325.

Each of the resilient plates 40 is square shaped, and defines a second through hole 410 for light passing therethrough at the center of itself. Each resilient plate 40 includes an outer periphery portion 46, an inner portion 47, and four resilient bars 48 surrounding the second through hole 410 in order from outside in. The resilient bars 48 are arranged between the outer periphery portion 46 and the inner portion 47. When an external force is applied on the resilient bars 48, the inner portion 47 and the resilient bars 48 move upwardly and downwardly relative to the outer periphery portion 46. The resilient plate 40 also defines four positioning cutouts 42 and four positioning through holes 41. The positioning cutouts 42 are equidistantly arranged, and communicate with the second through hole 410. Each of the positioning through holes 41 is defined in a corresponding corner of the outer periphery portion 46. The resilient plate 40 is fastened to the top side and the bottom side of the bracket 32 by engagement of the positioning through hole 41 by the respective locating pin 322. The four locating pins 322 on the bottom side of the bracket 32 are fastened to the board 60. In an alternate embodiment, the voice coil motor includes a single resilient plate.

Figure 3:
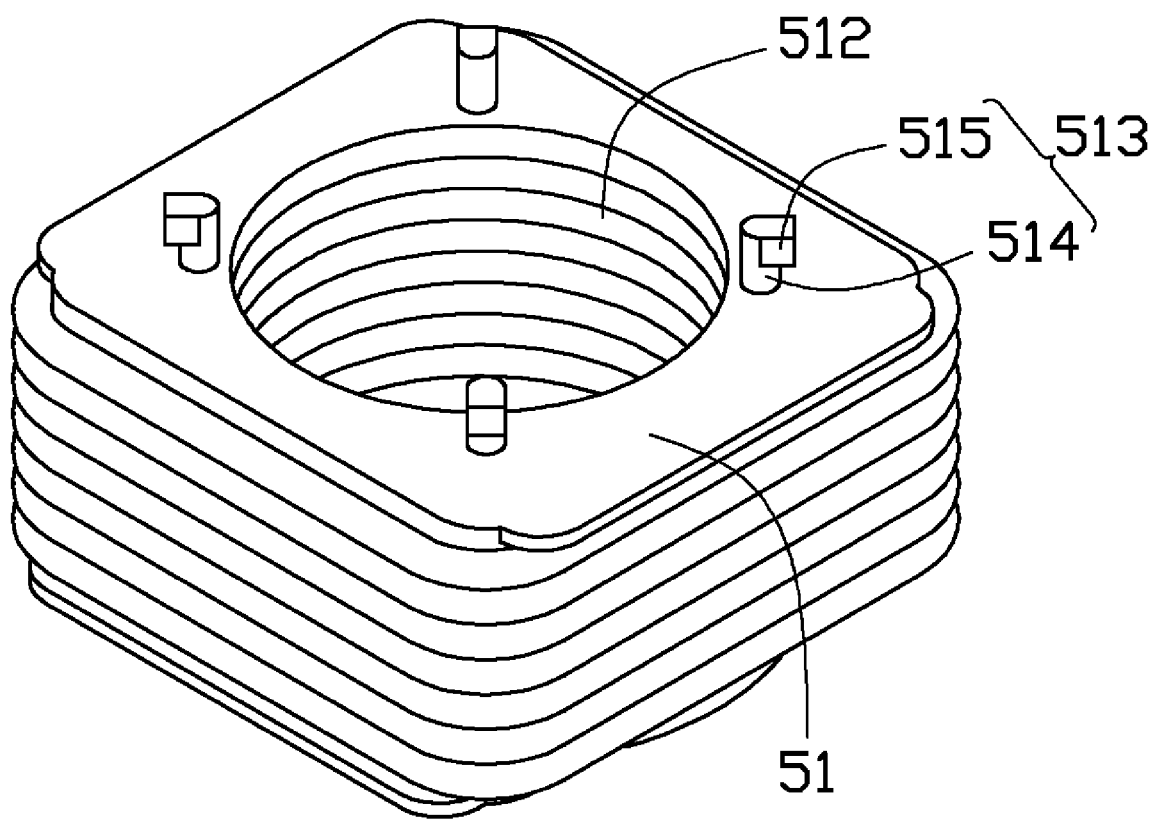
FIG. 3 is a schematic, isometric view of the movable unit in FIG. 2.
Figure 4:
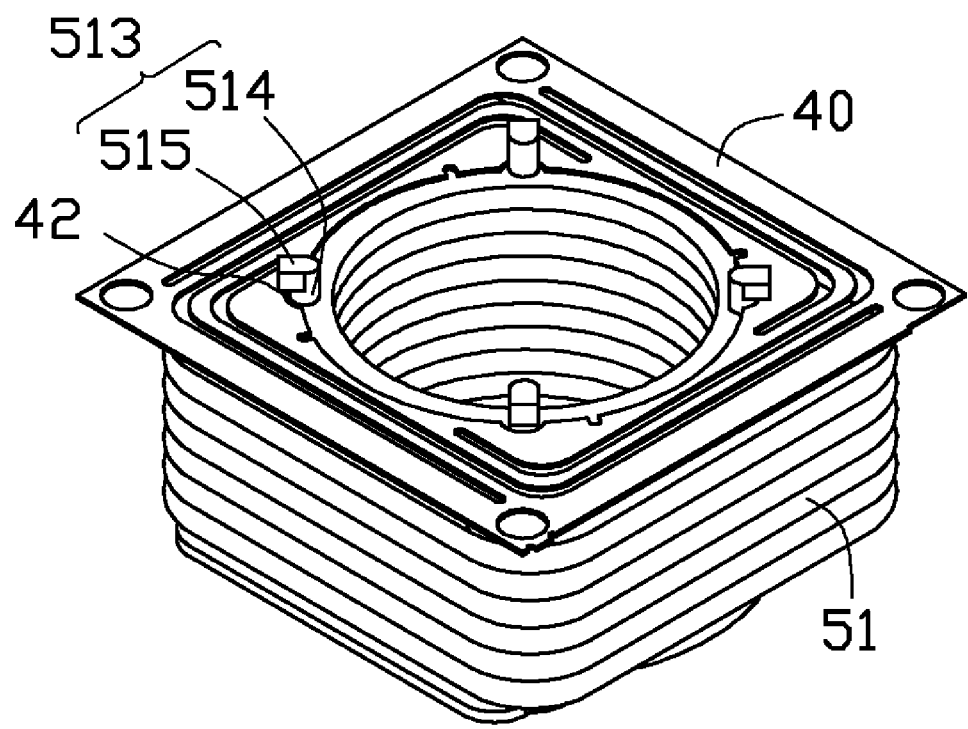
FIG. 4 is a schematic, assembled view of the movable unit and the resilient plate in FIG. 2.

Referring to FIGS. 2 to 4, the movable unit 40 is accommodated in the first accommodating room 321, and includes a lens barrel 51 and a plurality of fine pattern coils 52 surrounding the lens barrel 51.

The lens barrel 51 defines a second accommodating room 512 for accommodating the lenses and filters (not shown). Four fasteners 513 are respectively protruded out from the top and bottom sides of the lens barrel 51 corresponding to the four positioning cutouts 42. The fasteners 513 are configured for gripping or holding the resilient plate 40 and the lens barrel 51 together. Each of the fasteners 513 consists of a substantially cylindrical shaft 514 with one end attached to one of the top or bottom sides of the lens barrel 51 and a head 515 extending radially outwardly from the cylindrical shaft at the other end thereof, so as to prevent the resilient plate 40 from falling off the lens barrel 51. The cross section of the head 515 can be in other shapes such as rectangle, square, triangle, circle etc.

Each fine pattern coil 52 is flat and has thin coils in the form of printed circuit board manufactured with copper plating technology which realizes thick and fine pitch copper line design. Each fine pattern coil usually includes an insulated material layer and a plurality of copper patterns embedded in the insulated material layer. Generally, a fine pattern coil 52 consists of 1 to 6 copper pattern layers each made of copper wire. A thickness of each copper pattern layer is in a range from 30 to 200 micrometers. In the same copper pattern layer, a gap between neighboring copper wires is approximately 5 micrometers, a diameter of the copper wire is about 25 micrometers, and a pitch of neighboring copper wires is about 30 micrometers.

Figure 5:
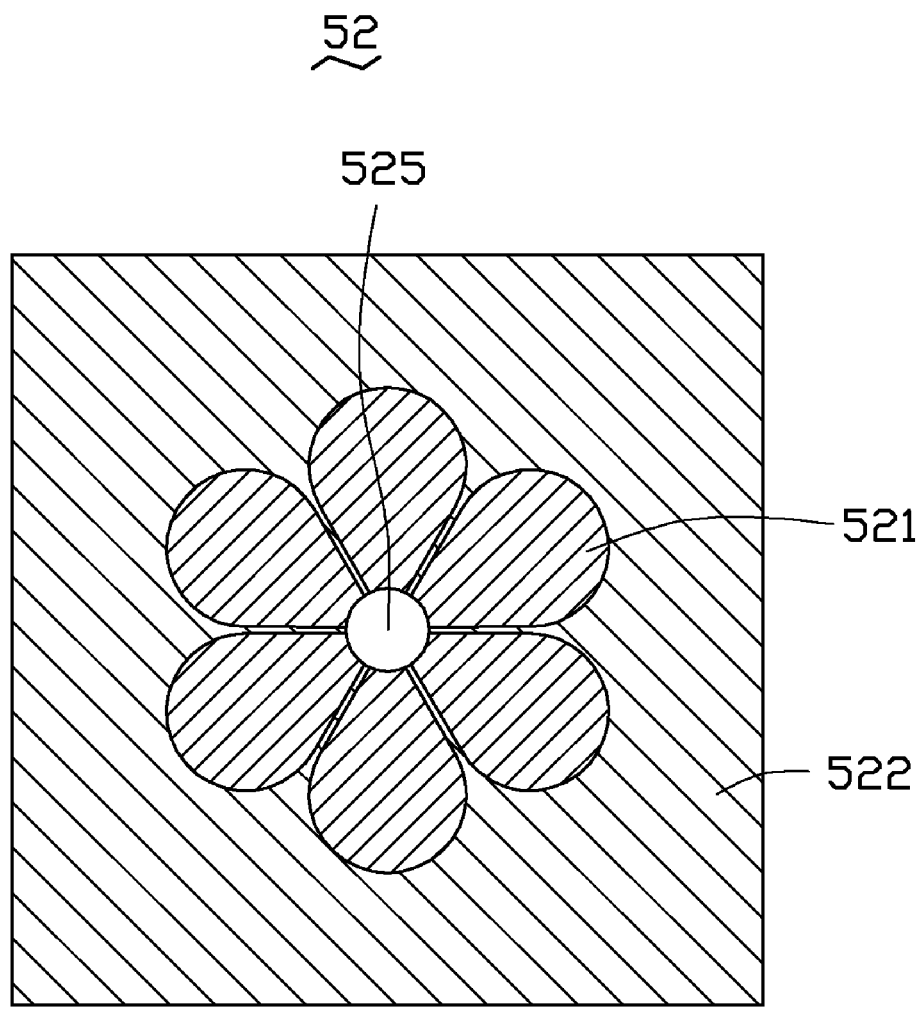
FIG. 5 is a schematic, cross-sectional view of the fine pattern coil in FIG. 2.

Referring to FIGS. 2 and 5, in the present embodiment, each of the fine pattern coils 52 is mounted on a sidewall of the lens barrel 51, facing a magnet 34. Each fine pattern coil 52 is board shaped, and includes a single layer of copper pattern consisting of an opening 525, a plurality of coil patterns 521 each consisting of copper wire having a thickness of about 25 micrometers, and a drive circuit 523 electrically connected to each of the coil patterns 521. The coil patterns 521 surround the opening 525, neighboring coil patterns 521 are separated by a flexible insulating material 522. In assembly of the voice coil motor 10, the fine pattern coils 52 are directly mounted on the sidewalls of the lens barrel 51, eliminating the need to wrap copper wires around the lens barrel 51. Therefore, much time and copper wires are saved.

When an electric current is applied to the drive circuit 523 of the fine pattern coils 52, the fine pattern coils 52 are excited to act upon the magnets 34, thereby producing a magnetic force to drive the movable unit 50 to move between the two resilient plates 40 till achieving a predetermined position.

When the electric current is cut off, the resilient plates 40 impart a pressure to the movable unit 50 relative to the bracket 32, thereby returning the lens barrel 51 to its original position.

In alternate embodiments, the bracket 32 is eliminated. As such, the two resilient plates 40 are accommodated in the housing 20 and separated from each other. Edges of each resilient plate 40 are fixed on an inner surface the side panel 24. Each of the two resilient plates 40 is assembled with the lens barrel 51 by engagement of the cutouts 42 with the respective fasteners 513. The magnets 34 are mounted on the side panels 24, and between the two resilient plates 40. For strengthening the magnetic force for driving the movable unit 50, more fine pattern coils 52 can be laminated on the sidewall of the bracket 32.

While certain embodiments have been described and exemplified above, various other embodiments will be apparent to those skilled in the art from the foregoing disclosure. The present invention is not limited to the particular embodiments described and exemplified but is capable of considerable variation and modification without departure from the scope of the appended claims.

What is claimed is:

1. A voice coil motor, comprising:
   a movable unit comprising a hollow lens barrel for accommodating a plurality of lenses, and a plurality of separated fine pattern coils, the lens barrel comprising a plurality of side walls, the fine pattern coils respectively fixed on the sidewalls of the lens barrel and configured for electrical connection to a power source, each of the fine pattern coils mounted on the corresponding sidewall of the lens barrel, the fine pattern coils surrounding the lens barrel;
   a fixed unit comprising a hollow frame structured bracket and a plurality of magnets mounted on the bracket, the bracket accommodating the movable unit therein, the magnets surrounding and spaced apart from the pattern coils, each of the magnets facing the corresponding fine pattern coil; and
   a resilient plate resiliently connected between the bracket and the lens barrel to hold the lens barrel on the bracket.

2. The voice coil motor of claim 1, wherein the resilient plate defines a through hole at the center thereof and a plurality of cutouts in the edge of the through hole, the lens barrel comprises a plurality of fasteners, each of the fastener comprises a shaft protruded out from the lens barrel and extending through the corresponding cutout and a head extending radially outwardly of the shaft at the distal end thereof away from the lens barrel for preventing the resilient plate from falling off the lens barrel, the resilient plate and the lens barrel are assembled together by engagement of the cutouts with the respective fasteners.

3. A voice coil motor, comprising:
   a housing comprising a top panel and a plurality of side panels extending from peripheral edges of the top panel;
   a movable unit comprising a hollow lens barrel for accommodating a plurality of lenses, and a plurality of separated fine pattern coils, the lens barrel comprising a plurality of side walls, the fine pattern coils respectively fixed on the sidewalls of the lens barrel and configured for electrical connection to a power source, each of the fine pattern coils mounted on the corresponding sidewall of the lens barrel, the fine pattern coils surrounding the lens barrel;
   a resilient plate accommodated in the housing with edges thereof fixed on the side panels, the resilient plate resiliently connected with the lens barrel; and
   a plurality of magnets surrounding the fine pattern coils and spaced apart from the at least one fine pattern coil, each of the magnets mounted on an inner surface of the corresponding side panels and facing one of the fine pattern coils.

4. The voice coil motor of claim 3, wherein the resilient plate comprises a through hole at the center thereof and a plurality of cutouts in the edge of the through hole, the lens barrel comprises a plurality of fasteners, each of the fastener comprises a shaft protruded out from the lens barrel and extending through the corresponding cutout and a head extending radially outwardly of the shaft at the distal end thereof away from the lens barrel for preventing the resilient plate from falling off the lens barrel, the resilient plate and the lens barrel are assembled together by engagement of the cutouts with the respective fasteners.

5. The voice coil motor of claim 1, wherein each of the fine pattern coils is board shaped, and includes a single layer of copper pattern consisting of an opening, a plurality of coil patterns each consisting of copper wire having a thickness of about 25 micrometers, and a drive circuit electrically connected to each of the coil patterns.

6. The voice coil motor of claim 5, wherein the coil patterns surround the opening, and each two neighboring coil patterns are separated by a flexible insulating material.

7. The voice coil motor of claim 3, wherein each of the fine pattern coils is board shaped, and includes a single layer of copper pattern with an opening defined therein, a plurality of coil patterns each consisting of copper wires, and a drive circuit electrically connected to each of the coil patterns.

8. The voice coil motor of claim 7, wherein the coil patterns surround the opening, and each two neighboring coil patterns are separated by a flexible insulating material.

* * * * *